United States Patent
Agarwal et al.

(10) Patent No.: US 12,417,518 B2
(45) Date of Patent: Sep. 16, 2025

(54) REPAIRING IRREGULARITIES IN COMPUTER-GENERATED IMAGES

(71) Applicant: ADOBE INC., San Jose, CA (US)

(72) Inventors: Anjali Agarwal, Sammamish, WA (US); Siavash Khodadadeh, Mountain View, CA (US); Ratheesh Kalarot, San Jose, CA (US); Hui Qu, Santa Clara, CA (US); Sven C. Olsen, Victoria (CA); Shabnam Ghadar, Menlo Park, CA (US)

(73) Assignee: ADOBE INC., San Jose, CA (US)

( * ) Notice: Subject to any disclaimer, the term of this patent is extended or adjusted under 35 U.S.C. 154(b) by 395 days.

(21) Appl. No.: 18/057,930

(22) Filed: Nov. 22, 2022

(65) Prior Publication Data
US 2024/0169499 A1 May 23, 2024

(51) Int. Cl.
  *G06T 5/77* (2024.01)
  *G06N 3/045* (2023.01)
  *G06T 3/4046* (2024.01)
  *G06T 3/4053* (2024.01)

(52) U.S. Cl.
CPC .............. *G06T 5/77* (2024.01); *G06N 3/045* (2023.01); *G06T 3/4046* (2013.01); *G06T 3/4053* (2013.01); *G06T 2207/20016* (2013.01); *G06T 2207/20081* (2013.01); *G06T 2207/20084* (2013.01); *G06T 2207/30201* (2013.01)

(58) Field of Classification Search
CPC .......... G06N 3/045; G06T 2207/20016; G06T 2207/20081; G06T 2207/20084; G06T 2207/30201; G06T 3/4046; G06T 3/4053; G06T 5/60; G06T 5/77
See application file for complete search history.

(56) References Cited

U.S. PATENT DOCUMENTS

| | | | |
|---|---|---|---|
| 6,583,823 B1 * | 6/2003 | Shimada ................ | H04N 5/253 348/E5.049 |
| 11,398,255 B1 * | 7/2022 | Mann ..................... | G06V 20/44 |

(Continued)

FOREIGN PATENT DOCUMENTS

| | | | | |
|---|---|---|---|---|
| CN | 108537133 | * | 9/2018 | ........... G06F 18/214 |
| CN | 111612799 | * | 9/2020 | ............ G06N 3/045 |

(Continued)

OTHER PUBLICATIONS

1Dolhansky, et al, "Eye In-Painting with Exemplar Generative Adversarial Networks", CoRR, arXiv preprintarXiv:1712.03999v1 [cs.CV] Dec. 11, 2017, 10 pages.

2Dastjerdi, et al, "Guided Co-Modulated GAN for 360° Field of View Extrapolation", arXiv preprint arXiv:2204.07286v2 [cs.CV] Aug. 23, 2022, 11 pages.

(Continued)

*Primary Examiner* — Zhiyu Lu
(74) *Attorney, Agent, or Firm* — F. CHAU & ASSOCIATES, LLC

(57) ABSTRACT

Systems and methods for image processing are provided. Embodiments include identifying an image of a face that includes an artifact in a part of the face. A machine learning model generates an intermediate image based on the original image. The intermediate image depicts the part of the face in a closed position. Then the model generates a corrected image based on the intermediate image. The corrected image depicts the face with the part of the face in an open position and without the artifact.

20 Claims, 16 Drawing Sheets

(56) References Cited

U.S. PATENT DOCUMENTS

| | | | | |
|---|---|---|---|---|
| 2008/0317455 A1* | 12/2008 | Abe | ............... | G06V 40/174 |
| | | | | 348/222.1 |
| 2011/0075926 A1* | 3/2011 | Piramuthu | ............. | G06T 7/11 |
| | | | | 382/173 |
| 2019/0197670 A1* | 6/2019 | Ferrer | ............... | G06V 10/764 |
| 2021/0125313 A1* | 4/2021 | Bai | ............... | G06V 10/806 |
| 2022/0245776 A1* | 8/2022 | Vaezi Joze | ............ | G06T 5/50 |
| 2022/0392025 A1* | 12/2022 | Mironica | ............. | G06T 5/50 |
| 2023/0177876 A1* | 6/2023 | Muse | ............... | G06V 40/172 |
| | | | | 382/118 |

FOREIGN PATENT DOCUMENTS

| | | | | |
|---|---|---|---|---|
| CN | 112381709 | * | 2/2021 | ............ G06N 3/08 |
| CN | 110910322 | * | 7/2022 | ............ G06T 5/77 |
| JP | 112423992 | * | 2/2021 | ......... B41J 11/0015 |
| WO | WO2021077140 | * | 4/2021 | ............ G06V 10/82 |

OTHER PUBLICATIONS

3Laine, et al, "Analyzing and Improving the Image Quality of StyleGAN", in proceedings of the IEEE/CVF Conference on Computer Vision and Pattern Recognition, pp. 8110-8119, arXiv preprint arXiv:1912.04958v2 [cs.CV] Mar. 23, 2020, 21 pages.

4Ledig, et al, "Photo-Realistic Single Image Super-Resolution Using a Generative Adversarial Network", CoRR, arXiv preprint arXiv:1609.04802v5 [cs.CV] May 25, 2017, 19 pages.

5Wang, et al, "Towards Real-World Blind Face Restoration with Generative Facial Prior", in proceedings of the IEEE/CVF Conference on Computer Vision and Pattern Recognition, pp. 9168-9178, arXiv preprint arXiv:2101.04061v2 [cs.CV] Jun. 11, 2021, 11 pages.

6Zhao, et al., "Large Scale Image Completion via Co-Modulated Generative Adversarial Networks", arXiv preprint arXiv:2103. 10428v1 [cs.CV] Mar. 18, 2021, 25 pages.

* cited by examiner 305-a    310-a 305-b    310-b 305-c    310-c

REPAIRING IRREGULARITIES IN COMPUTER-GENERATED IMAGES

BACKGROUND

The following relates generally to machine learning, and more specifically to machine learning for image processing.

Digital image processing generally refers to the use of a computer to edit a digital image (e.g., using an algorithm, a processing network, etc.). In some cases, image processing software may be used for various image processing tasks, such as image editing, image generation, etc. Some image processing systems may implement machine learning techniques, for example, to perform tasks using predictive models (e.g., without explicitly programing the system for each task), to perform tasks with more accuracy or in less time, to perform tasks using special-purpose hardware, etc.

Image generation (a subfield of digital image processing) may include using a machine learning model to generate images. Diffusion-based image generation models are a class of machine learning models used to generate images based on random noise. Generative adversarial networks (GANs) are another class of image generation networks that are trained based on an adversarial relationship between an image generator a discriminator network that learns to identify synthetic images.

SUMMARY

The present disclosure describes systems and methods for image processing. Embodiments of the present disclosure include an image processing apparatus configured to identify an image that includes a face and an artifact in a part of the face (e.g., the eyes or the mouth) and generate a corrected image of the face without the artifact. The image processing apparatus may perform one or more operations on the original image to generate the corrected image. For example, the image processing apparatus may close and open the eyes of the face in the image to generate the corrected image, the image processing apparatus may close and open the mouth of the face in the image to generate the corrected image, the image processing apparatus may perform super-resolution on the image to generate the corrected image, or the image processing apparatus may in-paint select regions of the image to generate the corrected image. Using these techniques, artifacts in images generated by a machine learning model (e.g., a diffusion-based image generation model) may be removed or corrected to generate more realistic and useful images.

A method, apparatus, non-transitory computer readable medium, and system for machine learning for image processing are described. One or more aspects of the method, apparatus, non-transitory computer readable medium, and system include identifying an image of a face, wherein the image includes an artifact in a part of the face; generating an intermediate image based on the image using an image generation network, wherein the intermediate image depicts the face with the part in a closed position; and generating a corrected image based on the intermediate image using the image generation network, wherein the corrected image depicts the face with the part of the face in an open position and without the artifact.

A method, apparatus, non-transitory computer readable medium, and system for machine learning for image processing are described. One or more aspects of the method, apparatus, non-transitory computer readable medium, and system include identifying an image of a face, wherein the image includes an artifact in a part of the face; generating a corrected image based on the image by closing and opening the part of the face using an image generation network; generating a high-resolution image based on the corrected image using a super-resolution network; and generating a subsequent corrected image based on the high-resolution image and a mask indicating a portion of the high-resolution image for inpainting using an inpainting network.

A method, apparatus, non-transitory computer readable medium, and system for machine learning for image processing are described. One or more aspects of the method, apparatus, non-transitory computer readable medium, and system include initializing an image generation network; obtaining training data including a training image that depicts a face with an artifact in a part of the face and a ground truth image that depicts the face without the artifact; and training the image generation network to correct the artifact by closing and then opening the part of the face.

An apparatus, system, and method for machine learning for image processing are described. One or more aspects of the apparatus, system, and method include a processor; a memory including instructions executable by the processor; a diffusion model configured to generate an image that includes an artifact in a part of a face; and an image generation network configured to generating a corrected image based on the by closing and opening the part of the face.

DETAILED DESCRIPTION

Figure 1:
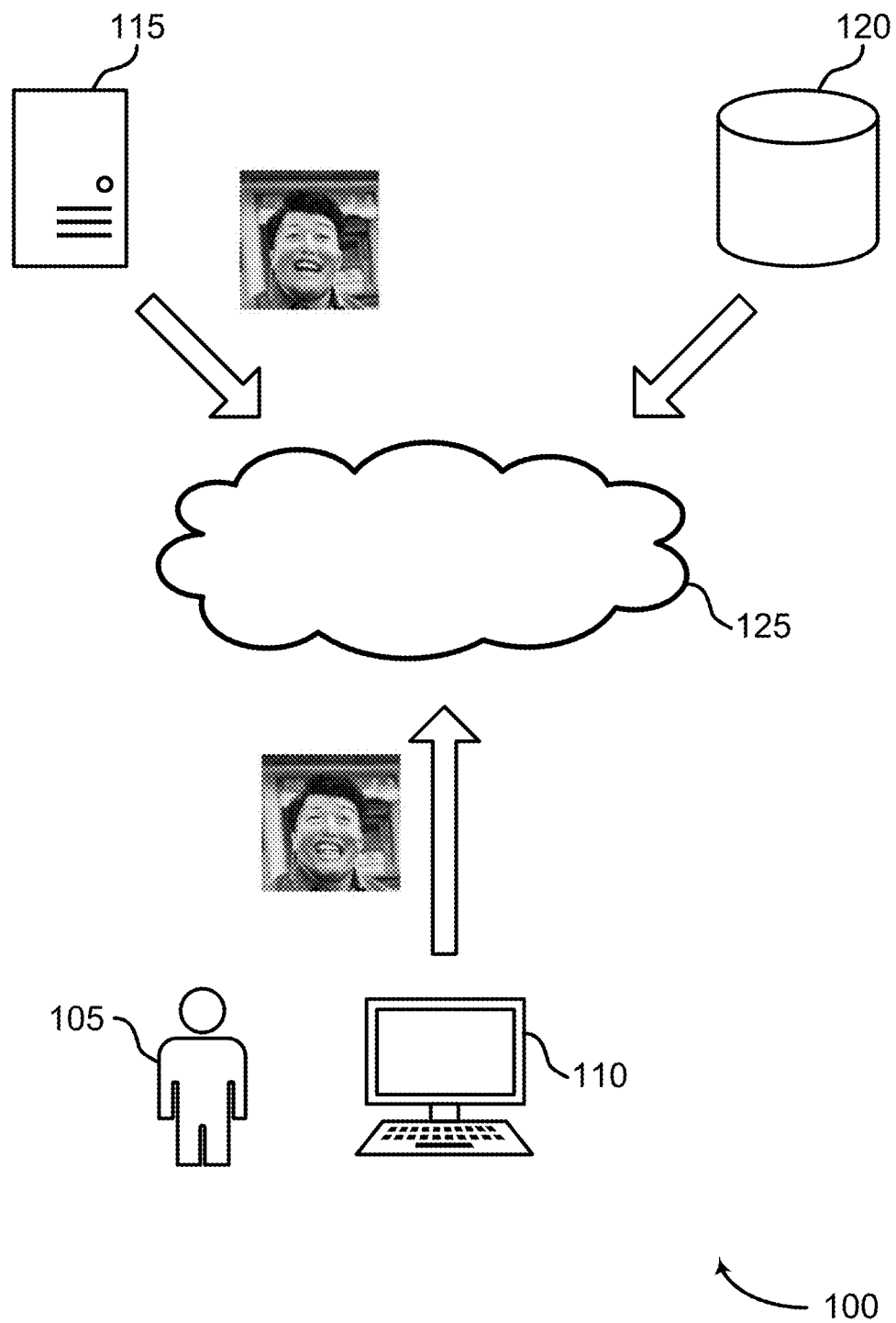
FIG. 1 shows an example of an image processing system according to aspects of the present disclosure.

The present disclosure describes systems and methods for image processing. Embodiments of the present disclosure include an image processing apparatus configured to identify an image that includes a face and an artifact in a part of the face (e.g., the eyes or the mouth) and generate a corrected image of the face without the artifact. The image processing apparatus may perform one or more operations on the original image to generate the corrected image. For example, the image processing apparatus may close and open the eyes of the face in the image to generate the corrected image, the image processing apparatus may close and open the mouth of the face in the image to generate the corrected image, the image processing apparatus may perform super-resolution on the image to generate the corrected image, or the image processing apparatus may in-paint select regions of the image to generate the corrected image. Using these techniques, artifacts in images generated by a machine learning model (e.g., a diffusion-based image generation model) may be removed or corrected to generate more realistic and useful images.

Diffusion models are a class of generative neural networks which can be trained to generate new data with features similar to features found in training data. Diffusion models can be used to generate novel images, such as novel images of faces. In some examples, however, diffusion models may generate poor results when creating faces. For instance, diffusion models may generate unwanted artifacts like asymmetries, distorted facial features, and unnatural holes in faces, leading to unrealistic results. Thus, the value and quality of the art produced by diffusion models may be limited by the irregularities in the faces they generate.

Embodiments of the present disclosure include an image processing apparatus configured to identify an original image of a face and generate a corrected image of the face (e.g., to generate an image without irregularities, with less obvious irregularities, etc.). Some embodiments provide an improvement over existing image generation systems by correcting artifacts or irregularities commonly generated by diffusion models. For example, an original image of a face may be generated by a diffusion model. The image processing apparatus may generate a corrected image by performing one or more operations on the original image. In some examples, the image processing apparatus may perform the one or more operations in series or in a pipeline to generate the corrected image.

In some embodiments, the one or more operations performed to generate the corrected image may include closing and opening a part of a face in an image (e.g., the eyes or the mouth in the image). In some embodiments, the one or more operations performed to generate the corrected image may include super-resolution. Super-resolution may refer to reducing the resolution of an image to generate a low-resolution image then increasing the resolution of the image to generate a high-resolution image. In some embodiments, the one or more operations performed to generate the corrected image may include inpainting. Inpainting may refer to inserting holes or blank regions in the image and filling in these holes or blank regions.

By performing these operations, the image processing apparatus may correct irregularities (e.g., remove artifacts) in images of faces. Further, because different operations may be useful for correcting different irregularities, the image processing apparatus may perform one or more of the operations (e.g., any combination of the operations) to correct specific irregularities. That is, the image processing apparatus may adjust or adapt the operations performed on images depending on the irregularities in the images to be corrected. Details regarding the architecture of an example image processing system are provided with reference to FIGS. 1-7. Details regarding the process of image processing are provided with reference to FIGS. 8-12. Example training processes are described with reference to FIG. 13-15.

Accordingly, embodiments of the present disclosure enable users to generate images that do not include artifacts and inconsistencies common when using diffusion models. For example, by closing the eyes or mouth (at least partially), and then opening them again, artifacts in these parts of the image can be removed. Embodiments also enable users to increase the resolution of an image, and to inpaint portions of an image that are targeted for correction. As a result, embodiments provide a seamless image generation pipeline that enables the production of images that more accurately represents a user's desired output.

Network Architecture

FIG. 1 shows an example of an image processing system 100 according to aspects of the present disclosure. According to FIG. 1, a user 105 may interact with image editing software on user device 110. The user device 110 may communicate with an image processing apparatus 115, which may be located on the cloud 125. The image processing apparatus 115 may generate an image of a face that includes one or more artifacts on the face. The image processing apparatus 115 may be configured to remove artifacts on images of faces generated by the image processing apparatus 115. For instance, the image processing apparatus 115 may identify an original image of a face and generate a corrected image of the face without or with less irregularities.

Artificial intelligence (AI)-generated art is becoming increasingly popular with various systems (e.g., Dalle-2, Midjourney, Stable Diffusion) capable of generating realistic or useful images. However, these diffusion-powered technologies often generate unsatisfactory results when creating faces. Issues like asymmetries, distorted facial features, and holes in the faces generated by these technologies may be common, leading to unrealistic results. The value and quality of the art produced by diffusion models may be limited by the irregularities in the faces these models generate.

The image processing apparatus 115 may include one or more models (e.g., a pipeline of models) that allow for improving the quality of a face in a diffusion-generated image, while preserving the original identity of the face in the image. The image processing apparatus 115 may combine super-resolution techniques, inpainting, and targeted fixes of the eyes and mouth (e.g., eye-opening and eye-closing) to generate a high-quality image. Each model may be based on a modified comodulated generative adversarial network (co-mod-GAN) architecture. In some examples, the image processing apparatus 115 may use the models for facial repairing or the models for facial repairing may run in real-time on a user's local machine (e.g., on the user device 110). In some examples, the models may generate faces that may be perceived as having a higher quality than an original, diffusion-generated image.

Eye-opening and eye-closing involves taking an image and returning an image where the eyes appear more open or closed. The same can be done with the mouth. In some examples, exemplar models (e.g., GANs) may be used specifically for the task of eye-opening. Both an image A of an individual with closed eyes and an image B of the same individual with open eyes may be used to repair image A.

These models may preserve the identity of an individual. However, these models may not accept input regarding how much to open the eyes.

Super resolution may refer to the process of taking a low-resolution image and estimating a higher-resolution counterpart. This technique can be used to repair an image with irregularities by shrinking the image to a low resolution and then passing the image through a super resolution model (e.g., that produces an image with a high resolution). Super resolution may be performed using GAN networks (e.g., with up to a resolution of 4 times or 16 times an input resolution).

Inpainting may refer to filling holes in a given image. Inpainting may be used to remove, add, or edit objects in a scene. In the context of face repairing, inpainting may be used to inpaint a region of a face that is irregular. The output of an inpainting model returns a more realistic face. A co-mod GAN may be used for inpainting. In some examples, a generative model architecture may be leveraged while adding an encoding module for context.

In some examples, the image processing apparatus 115 may include a server. A server provides one or more functions to users 105 linked by way of one or more of the various networks. In some cases, the server includes a single microprocessor board, which includes a microprocessor responsible for controlling all aspects of the server. In some cases, a server uses microprocessor and protocols to exchange data with other devices/users 105 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device 110, a personal computer, a laptop computer, a mainframe computer, a super computer, or any other suitable processing apparatus.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 105 interacts with database 120 controller. In other cases, database 120 controller may operate automatically without user 105 interaction.

A cloud 125 is a computer network configured to provide on-demand availability of computer system resources, such as data storage and computing power. In some examples, the cloud 125 provides resources without active management by the user 105. The term cloud 125 is sometimes used to describe data centers available to many users 105 over the Internet. Some large cloud 125 networks have functions distributed over multiple locations from central servers. A server is designated an edge server if it has a direct or close connection to a user 105. In some cases, a cloud 125 is limited to a single organization. In other examples, the cloud 125 is available to many organizations. In one example, a cloud 125 includes a multi-layer communications network comprising multiple edge routers and core routers. In another example, a cloud 125 is based on a local collection of switches in a single physical location.

A computing device 110 is a personal computer, laptop computer, mainframe computer, palmtop computer, personal assistant, mobile device, or any other suitable processing apparatus. In one aspect, image processing system 100 includes user 105, computing device 110, image processing apparatus 115, database 120, and cloud 125. Image processing apparatus 115 is an example of, or includes aspects of, the corresponding element described with reference to FIG. 2.

Figure 2:
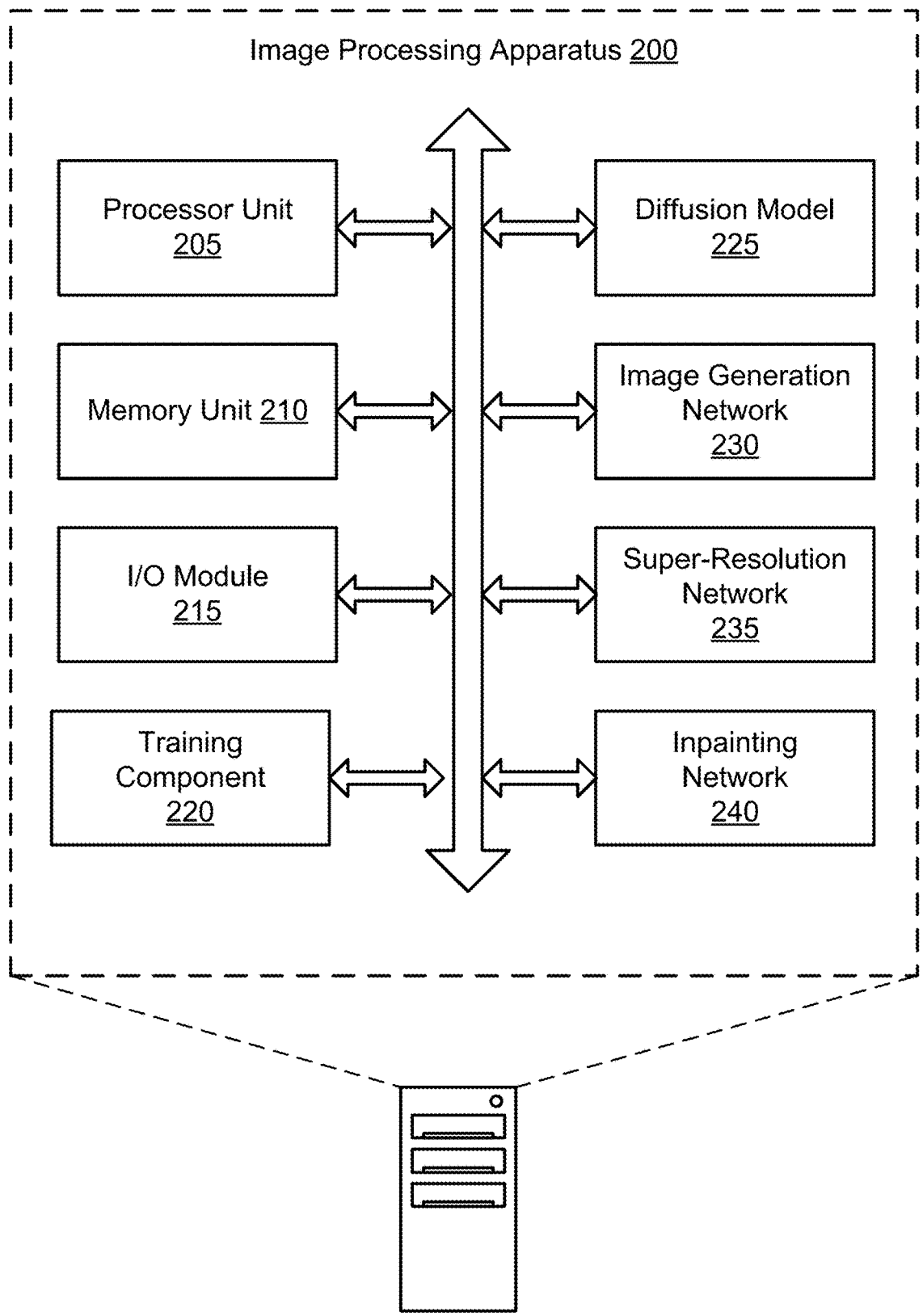
FIG. 2 shows an example of an image processing apparatus according to aspects of the present disclosure.

FIG. 2 shows an example of an image processing apparatus 200 according to aspects of the present disclosure. The example shown includes image processing apparatus 200, processor unit 205, memory unit 210, I/O module 215, training component 220, diffusion model 225, image generation network 230 (e.g., a co-modulated generative adversarial network (GAN)), super-resolution network 235 (e.g., a GAN), and inpainting network 240 (e.g., a GAN with an encoding module configured to encode image context). Image processing apparatus 200 is an example of, or includes aspects of, the corresponding element described with reference to FIG. 1.

Processor unit 205 comprise a processor. Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 205 is configured to operate a memory array using a memory controller. In other cases, a memory controller is integrated into the processor unit 205. In some cases, the processor unit 205 is configured to execute computer-readable instructions stored in a memory to perform various functions. In some embodiments, a processor unit 205 includes special purpose components for modem processing, baseband processing, digital signal processing, or transmission processing.

Memory unit 210 comprise a memory including instructions executable by the processor. Examples of a memory unit 210 include random access memory (RAM), read-only memory (ROM), or a hard disk. Examples of memory units 210 include solid state memory and a hard disk drive. In some examples, memory is used to store computer-readable, computer-executable software including instructions that, when executed, cause a processor to perform various functions described herein. In some cases, the memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image processing apparatus 200 includes a computer-implemented artificial neural network (ANN) to generate classification data for a set of samples. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 200 includes a computer-implemented convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, image generation network 230 identifies an image of a face, where the image includes an artifact in a part of the face. In some examples, image generation network 230 generates an intermediate image based on the image using an image generation network 230, where the intermediate image depicts the face with the part of the face in a closed position. In some examples, image generation network 230 generates a corrected image based on the intermediate image, where the corrected image depicts the face with the part of the face in an open position and without the artifact. In some aspects, the part of the face includes an eye or a mouth.

According to some aspects, diffusion model 225 generates the image of the face, where the artifact is a product of the diffusion model 225.

According to some aspects, image processing apparatus 200 identifies an attribute associated with the position of the part of the face. In some examples, image processing apparatus 200 selects a first value for the attribute associated with the closed position. In some examples, image processing apparatus 200 provides the first value for the attribute to the image generation network 230, where the intermediate image is based on the first value.

In some examples, image processing apparatus 200 selects a second value for the attribute associated with the open position. In some examples, image processing apparatus 200 provides the second value for the attribute to the image generation network 230, where the corrected image is based on the second value.

According to some aspects, training component 220 identifies training data including first training images showing faces including artifacts in the part of the face and second training images corresponding to the first training images without the artifacts in the part of the face. In some examples, training component 220 trains the image generation network 230 based on the training data.

According to some aspects, super-resolution network 235 generates a high-resolution image based on the corrected image using a super-resolution network 235.

In some examples, training component 220 identifies a set of high-resolution images. In some examples, training component 220 generates a set of low-resolution images based on the high-resolution images. In some examples, training component 220 trains the super-resolution network 235 based on the set of high-resolution images and the set of low-resolution images.

According to some aspects, inpainting network 240 identifies a portion of the image including an additional artifact. In some examples, inpainting network 240 generates a subsequent corrected image based on the corrected image and the identified portion using an inpainting network 240.

In some examples, training component 220 identifies a set of images. In some examples, training component 220 generates a set of image masks for the set of images, respectively, by applying a random number of inpainting regions with randomized positions. In some examples, training component 220 trains the inpainting network 240 based on the set of images and the set of image masks.

In some examples, inpainting network 240 displays the corrected image to a user. In some examples, inpainting network 240 receives a user input indicating the portion of the image. In some examples, inpainting network 240 generates a binary mask indicating the portion of the image, where the subsequent corrected image is generated based on the binary mask.

According to some aspects, image generation network 230 identifies an image of a face, where the image includes an artifact in a part of the face. In some examples, image generation network 230 generates a corrected image based on the image by closing and opening the part of the face. According to some aspects, super-resolution network 235 generates a high-resolution image based on the corrected image. According to some aspects, inpainting network 240 generates a subsequent corrected image based on the high-resolution image and a mask indicating a portion of the high-resolution image for inpainting.

According to some aspects, image processing apparatus 200 identifies an attribute associated with the position of the part of the face. In some examples, image processing apparatus 200 selects a first value for the attribute associated with the closed position. In some examples, image processing apparatus 200 provides the first value for the attribute to the image generation network 230. In some examples, image generation network 230 generates the corrected image based on the first value.

In some examples, image processing apparatus 200 selects a second value for the attribute associated with the open position. In some examples, image processing apparatus 115 provides the second value for the attribute to the image generation network 230, where the corrected image is generated based on the second value.

The described methods may be implemented or performed by devices that include a general-purpose processor, a digital signal processor (DSP), an application-specific integrated circuit (ASIC), a field programmable gate array (FPGA) or other programmable logic devices, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
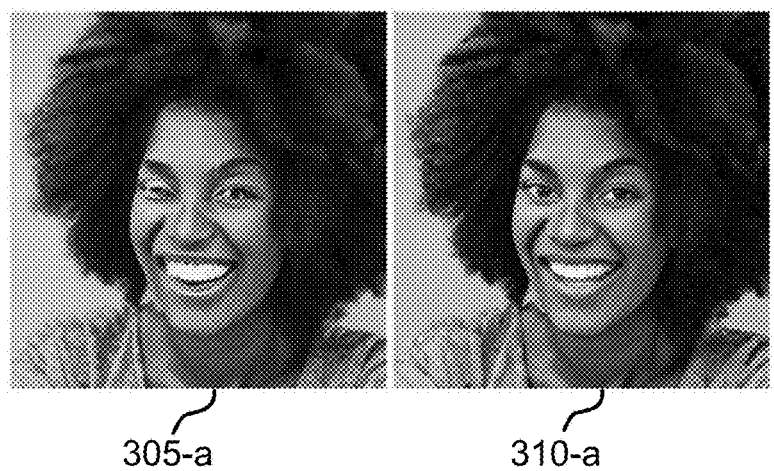
FIG. 3 shows example input and output images according to aspects of the present disclosure.
Figure 3:
Figure 3:
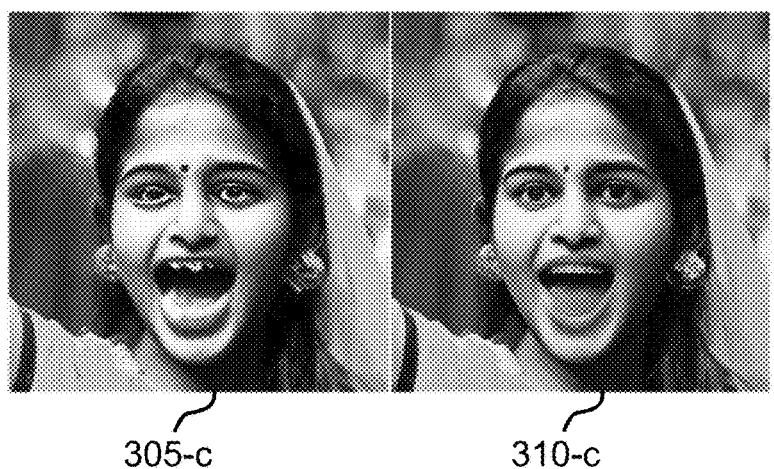

FIG. 3 shows example input and output images according to aspects of the present disclosure. The input images 305 include one or more irregularities, and the output images 310 are generated with less or no irregularities using the techniques described herein.

Figure 4:
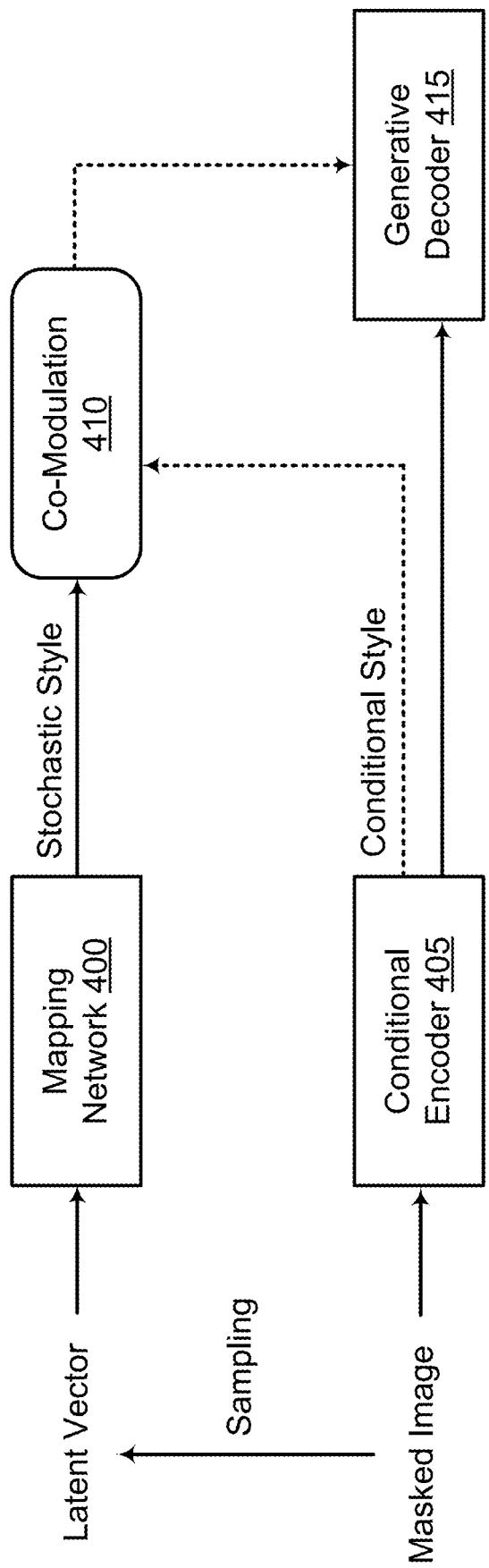
FIG. 4 shows an example of an image generation model according to aspects of the present disclosure.

FIG. 4 shows an example of an image generation model according to aspects of the present disclosure. The example shown includes mapping network 400, conditional encoder 405, co-modulation 410, and generative decoder 415. CoModGAN generates diverse and consistent contents not only to small-scale inpainting but also large-scale image completion by embedding both conditional and stochastic style representations. Conditional style representation is a type of learned styled representations embedded from a conditional input to enhance an output. Stochastic style representation is used for large-scale image completion and is able to produce diverse results even when both input image and input mask are fixed.

Referring to FIG. 4, a masked image is sampled into a latent vector. Mapping networks 400 receives the latent vector and a stochastic style is applied to the output feature of mapping network 400. Additionally, conditional encoder 405 encodes the masked image and a conditional style is applied to the output feature of conditional encoder 405.

Co-modulation 410 is applied to the output feature of mapping network 400 and the output feature of conditional encoder 405. Output from co-modulation 410 is input to generative decoder 415. In some cases, the image generation model applies co-modulation 410 for large-scale image completion. As a result, both result from the co-modulation and the output feature of conditional encoder 405 are received as inputs of generative decoder 415. In some cases, the image generation model does not apply co-modulation 410 for small-scale image inpainting, and the output feature of conditional encoder 405 is taken as the input to generative decoder 415.

Mapping network 400 is an example of, or includes aspects of, the corresponding element described with reference to FIGS. 5 and 6. Conditional encoder 405 is an example of, or includes aspects of, the corresponding element described with reference to FIG. 5. Generative decoder 415 is an example of, or includes aspects of, the synthesis network described with reference to FIGS. 5 and 6.

Guided CoModGAN is an extension of CoModGAN. Guided CoModGAN takes a "guide" vector along with the input image and mask. Guided CoModGAN controls the content generation by extracting a guide from the original image and filling in the masked areas in the image according to the guide.

Figure 5:
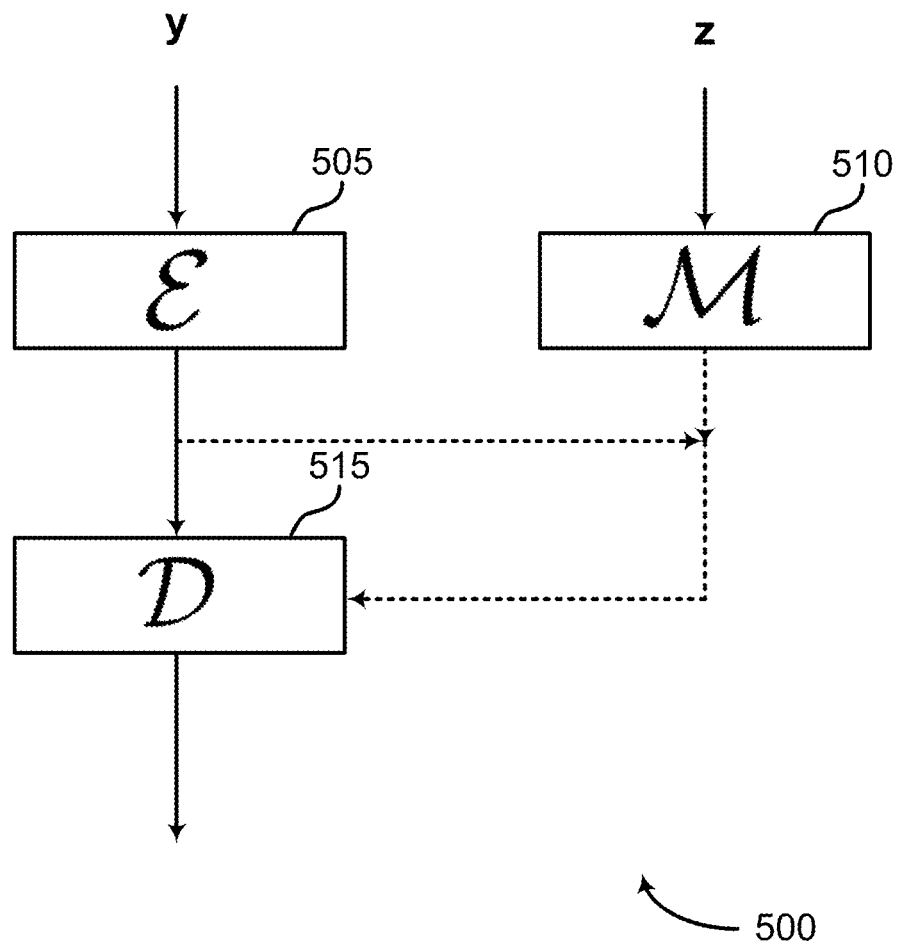
FIG. 5 shows an example of co-modulation according to aspects of the present disclosure.

FIG. 5 shows an example of co-modulation according to aspects of the present disclosure. The example shown includes co-modulated generator 500, conditional encoder 505, mapping network 510, and generative decoder 515. Co-modulation combines the generative capability from unconditional modulated generators with the image-conditional generators. Conditional encoder 505 receives input y and generates output feature. A latent vector z is input to mapping network 510 and the mapped latent vector generates a style vector for each subsequent modulation through a learned affined transformation. In some cases, the output feature from conditional encoder 505 and the style vector are input into generative decoder 515. In some cases, the output feature from conditional encoder 505 is directly input into generative decoder 515.

Conditional encoder 505 is an example of, or includes embodiments of, the corresponding element described with reference to FIG. 4. Mapping network 510 is an example of, or includes embodiments of, the corresponding element described with reference to FIGS. 4 and 6. Generative decoder 515 is an example of, or includes embodiments of, the corresponding element described with reference to FIG. 4.

Figure 6:
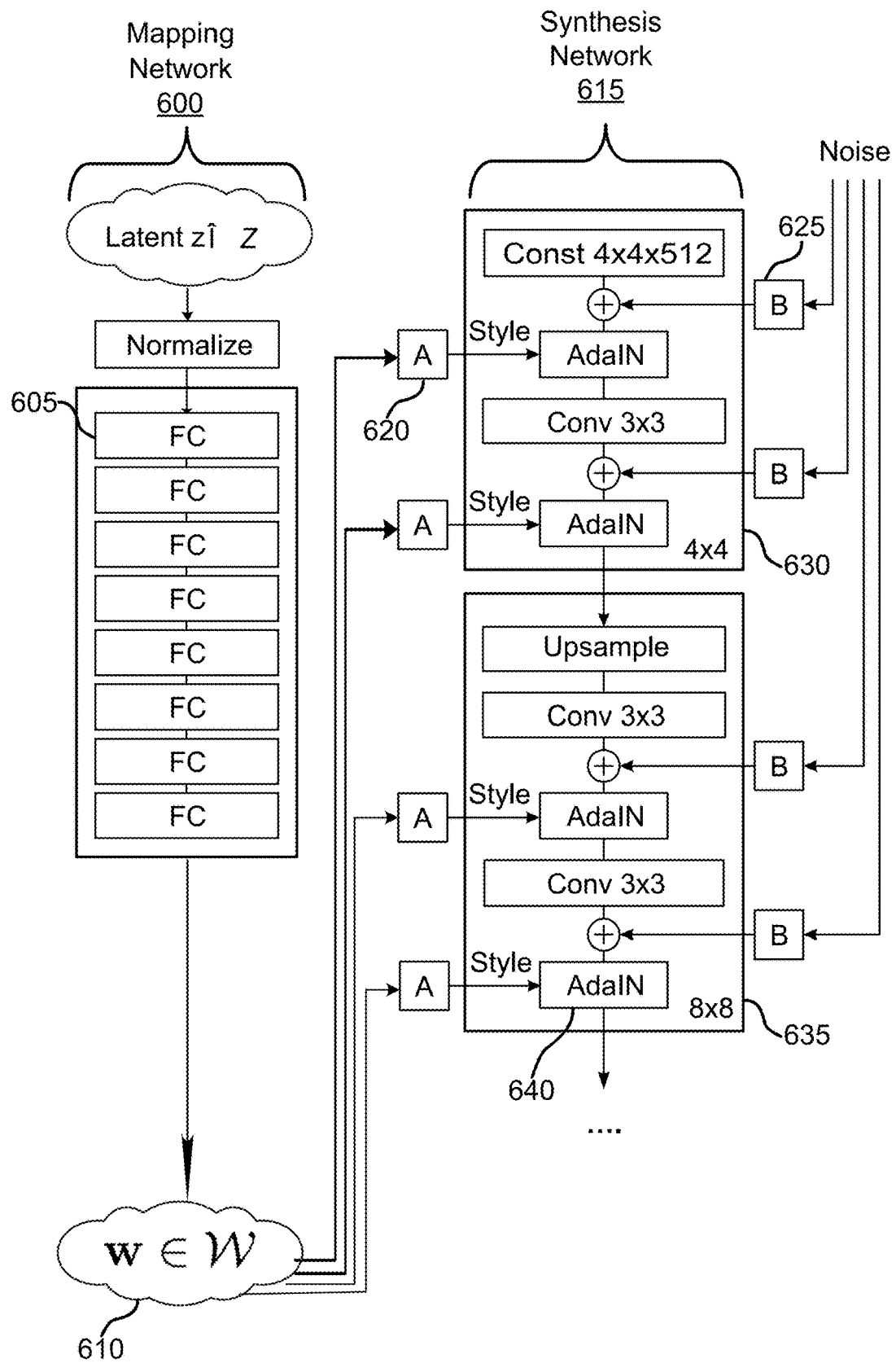
FIG. 6 shows an example of a style-based generator according to aspects of the present disclosure.

FIG. 6 shows an example of a style-based generator according to aspects of the present disclosure. The example shown includes mapping network 600, fully-connected layer 605, intermediate latent space 610, synthesis network 615, learned affine transform 620, learned per-channel scaling factors 625, first convolution layer 630, second convolution layer 635, and adaptive instance normalization 640.

Mapping network 600 is an example of, or includes embodiments of, the corresponding element described with reference to FIGS. 4 and 5.

GANs are a group of artificial neural networks where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some embodiments, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network, i.e., to produce novel candidates that the discriminator network classifies as real.

FIG. 6 shows an example of a style generative adversarial networks (StyleGAN). StyleGAN is an extension to the GAN architecture that uses an alternative generator network. StyleGAN includes using a mapping network 600 to map points in latent space to an intermediate latent space 610, using an intermediate latent space 610 to control style at each point, and introducing noise as a source of variation at each point in the generator network.

The mapping network 600 performs a reduced encoding of the original input and the synthesis network 615 generates, from the reduced encoding, a representation as close as possible to the original input.

According to some embodiments, the mapping network 600 includes a deep learning neural network comprised of fully connected (FC) layers 605. In some cases, the mapping network 600 takes a randomly sampled point from the latent space, such as intermediate latent space 610, as input and generates a style vector as output.

According to some embodiments, the synthesis network 615 includes a first convolutional layer 630 and a second convolutional layer 635. For example, the first convolutional layer 630 includes convolutional layers, such as a cony 3×3, adaptive instance normalization (AdaIN) layers, or a constant, such as a 4×4×512 constant value. For example, the second convolutional layer 635 includes an upsampling layer (e.g., upsample), convolutional layers (e.g., cony 3×3), and adaptive instance normalization (AdaIN) layers.

The synthesis network 615 takes a constant value, for example, a constant 4×4×512 constant value, as input to start the image synthesis process. The style vector generated from the mapping network 600 is transformed by learned affine transform 620 and is incorporated into each block of the synthesis network 615 after the convolutional layers (e.g., cony 3×3) via the AdaIN operation, such as adaptive instance normalization 640. In some cases, the adaptive instance normalization layers can perform the adaptive instance normalization 640. The AdaIN layers first standardizes the output of feature map so that the latent space maps to features in a way so that a randomly selected feature map will result in features that are distributed with a Gaussian distribution, then add the style vector as a bias term. This allows choosing a random latent variable and so that the resulting output will not bunch up. In some cases, the output of each convolutional layer (e.g., cony 3×3) in the synthesis network 615 is a block of activation maps. In some cases, the upsampling layer doubles the dimensions of input (e.g., from 4×4 to 8×8) and is followed by another convolutional layer(s) (e.g., third convolutional layer).

According to some embodiments, Gaussian noise is added to each of these activation maps prior to the adaptive instance normalization 640. A different noise sample is generated for each block and is interpreted using learned per-layer scaling factors 625. In some embodiments, the Gaussian noise introduces style-level variation at a given level of detail.

Figure 7:
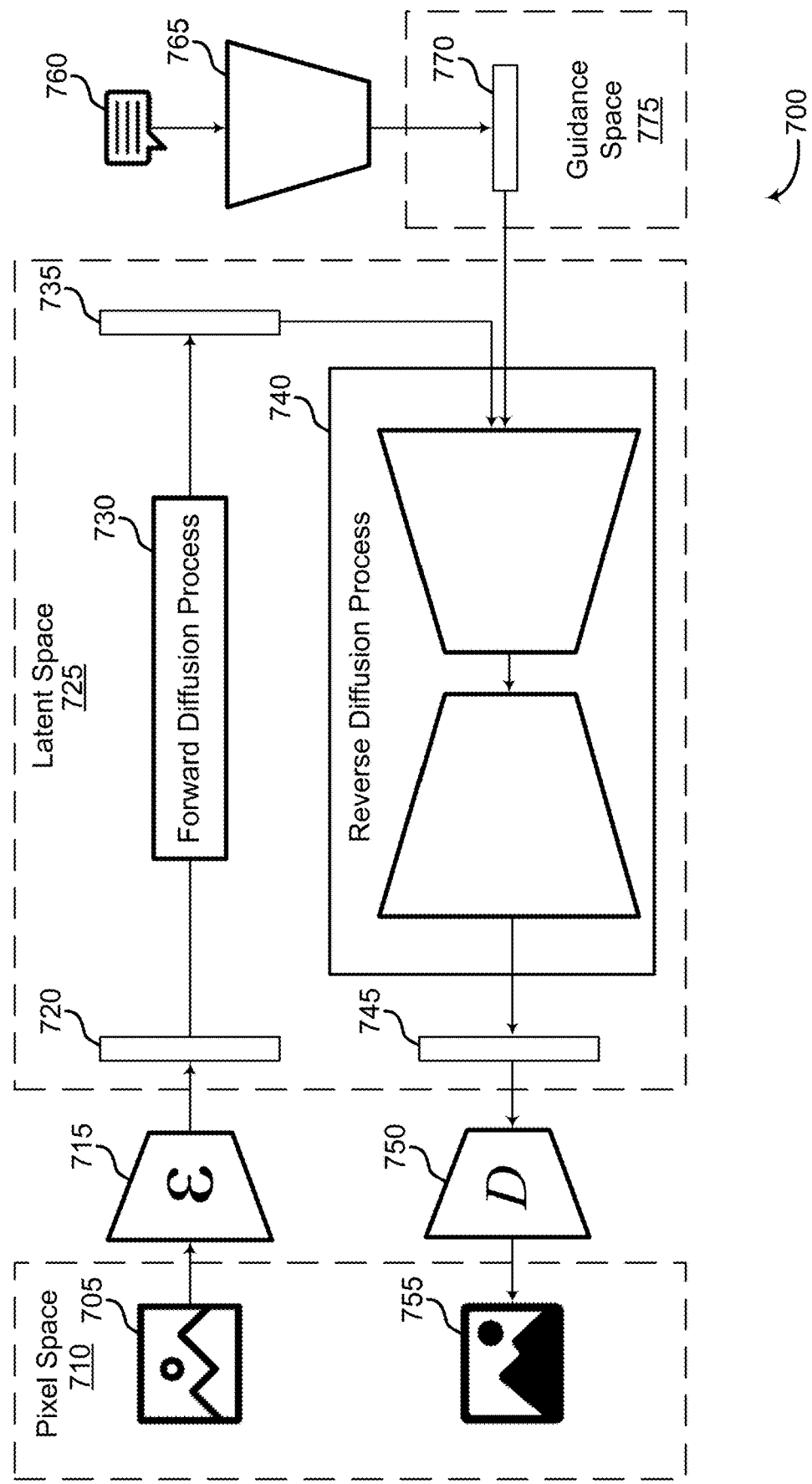
FIG. 7 shows an example of a guided latent diffusion model according to aspects of the present disclosure.

FIG. 7 shows an example of a guided latent diffusion model 700 according to aspects of the present disclosure. The guided latent diffusion model 700 depicted in FIG. 7 is an example of, or includes aspects of, the corresponding element described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 700 may take an original image 705 in a pixel space 710 as input and apply and image encoder 715 to convert original image 705 into original image features 720 in a latent space 725. Then, a forward diffusion process 730 gradually adds noise to the original image features 720 to obtain noisy features 735 (also in latent space 725) at various noise levels.

Next, a reverse diffusion process 740 (e.g., a U-Net ANN) gradually removes the noise from the noisy features 735 at the various noise levels to obtain denoised image features 745 in latent space 725. In some examples, the denoised image features 745 are compared to the original image features 720 at each of the various noise levels, and parameters of the reverse diffusion process 740 of the diffusion model are updated based on the comparison. Finally, an image decoder 750 decodes the denoised image features 745 to obtain an output image 755 in pixel space 710. In some cases, an output image 755 is created at each of the various noise levels. The output image 755 can be compared to the original image 705 to train the reverse diffusion process 740.

In some cases, image encoder 715 and image decoder 750 are pre-trained prior to training the reverse diffusion process 740. In some examples, they are trained jointly, or the image encoder 715 and image decoder 750 and fine-tuned jointly with the reverse diffusion process 740.

The reverse diffusion process 740 can also be guided based on a text prompt 760, or another guidance prompt, such as an image, a layout, a segmentation map, etc. The text prompt 70 can be encoded using a text encoder 765 (e.g., a multimodal encoder) to obtain guidance features 770 in guidance space 775. The guidance features 770 can be combined with the noisy features 735 at one or more layers of the reverse diffusion process 740 to ensure that the output image 755 includes content described by the text prompt 760. For example, guidance features 770 can be combined with the noisy features 735 using a cross-attention block within the reverse diffusion process 740.

Image Processing

Figure 8:
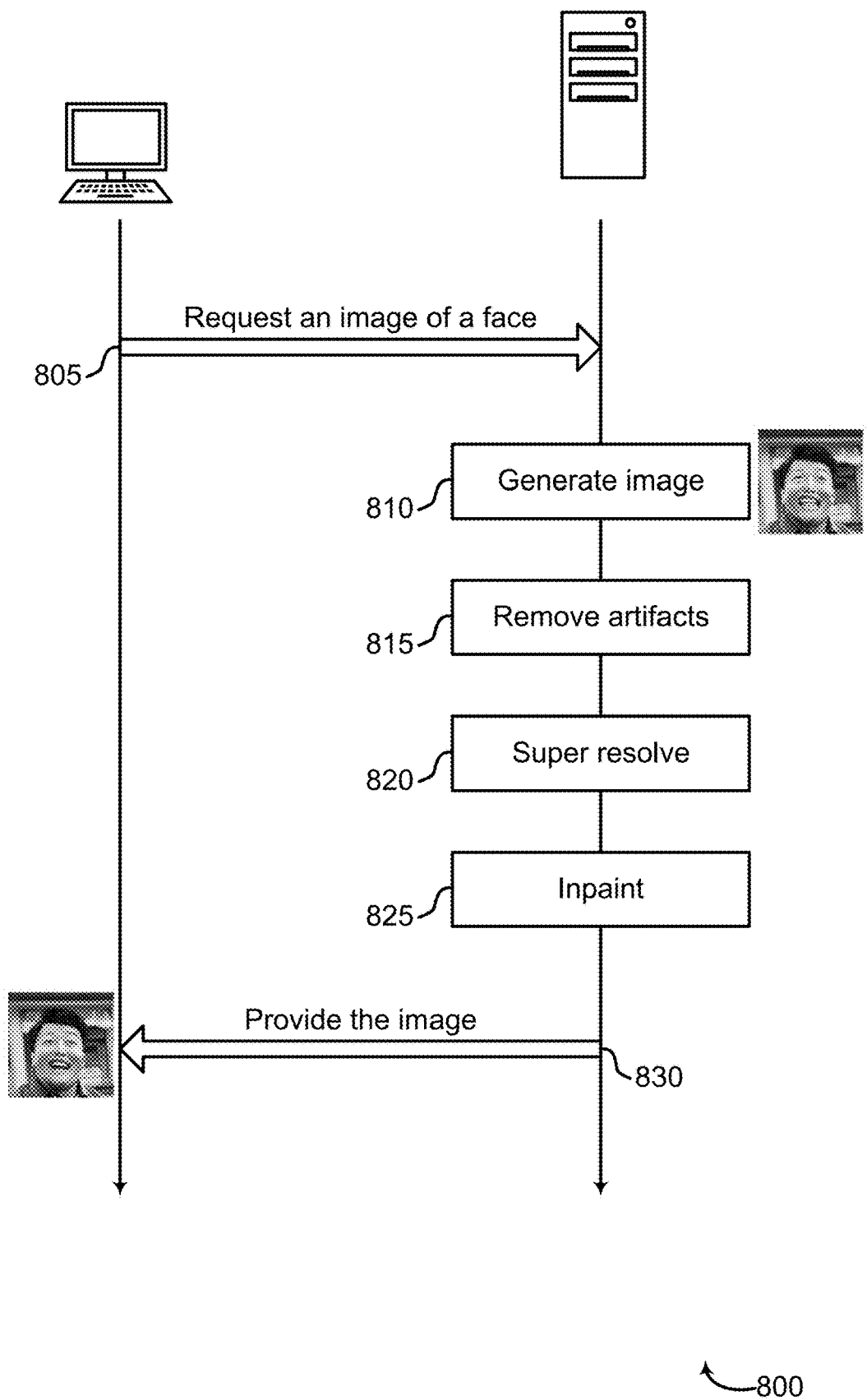
FIG. 8 shows an example of a method for image processing according to aspects of the present disclosure.

FIG. 8 shows an example of a method 800 for image processing according to aspects of the present disclosure. In some examples, the described operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, a user may request an image of a face. In some cases, the operations of this step refer to, or may be performed by, a computing device as described with reference to FIG. 1 (e.g., based on a user interaction).

At operation 810, the system identifies an image of a face, where the image includes an artifact in a part of the face. In some examples, the system may generate the image of the face using a diffusion model, where the artifact is a product of the diffusion model. In some cases, the operations of this step refer to, or may be performed by, a diffusion model described with reference to FIG. 2.

At operation 815, the system may remove artifacts in the image of the face to generate a corrected image. For instance, the system may remove artifacts in the eyes and mouth of the face in an image to generate the corrected image. The corrected image may be referred to as an intermediate image if the system is to perform another operation on the corrected image to correct additional irregularities in the corrected image. In some cases, the operations of this step refer to, or may be performed by, an image generation network described with reference to FIG. 2.

At operation 820, the system may super-resolve the image identified at operation 810 or the image generated by operation 815 to generate a corrected image. The corrected image may be referred to as an intermediate image if the system is to perform another operation on the corrected image to correct additional irregularities in the corrected image. In some cases, the operations of this step refer to, or may be performed by, a super-resolution network described with reference to FIG. 2.

At operation 825, the system may identify an additional artifact in a portion of the image identified at operation 810, the image generated by operation 815, or the image generated by operation 820, and the system may inpaint the image to generate a corrected image. The corrected image may be referred to as an intermediate image if the system is to perform another operation on the corrected image to correct additional irregularities in the corrected image. In some cases, the operations of this step refer to, or may be performed by, an inpainting network described with reference to FIG. 2.

At 830, the system may provide the image of the face (e.g., the corrected image) to the user. In some cases, the operations of this step refer to, or may be performed by, an image processing apparatus described with reference to FIG. 2.

Figure 9:
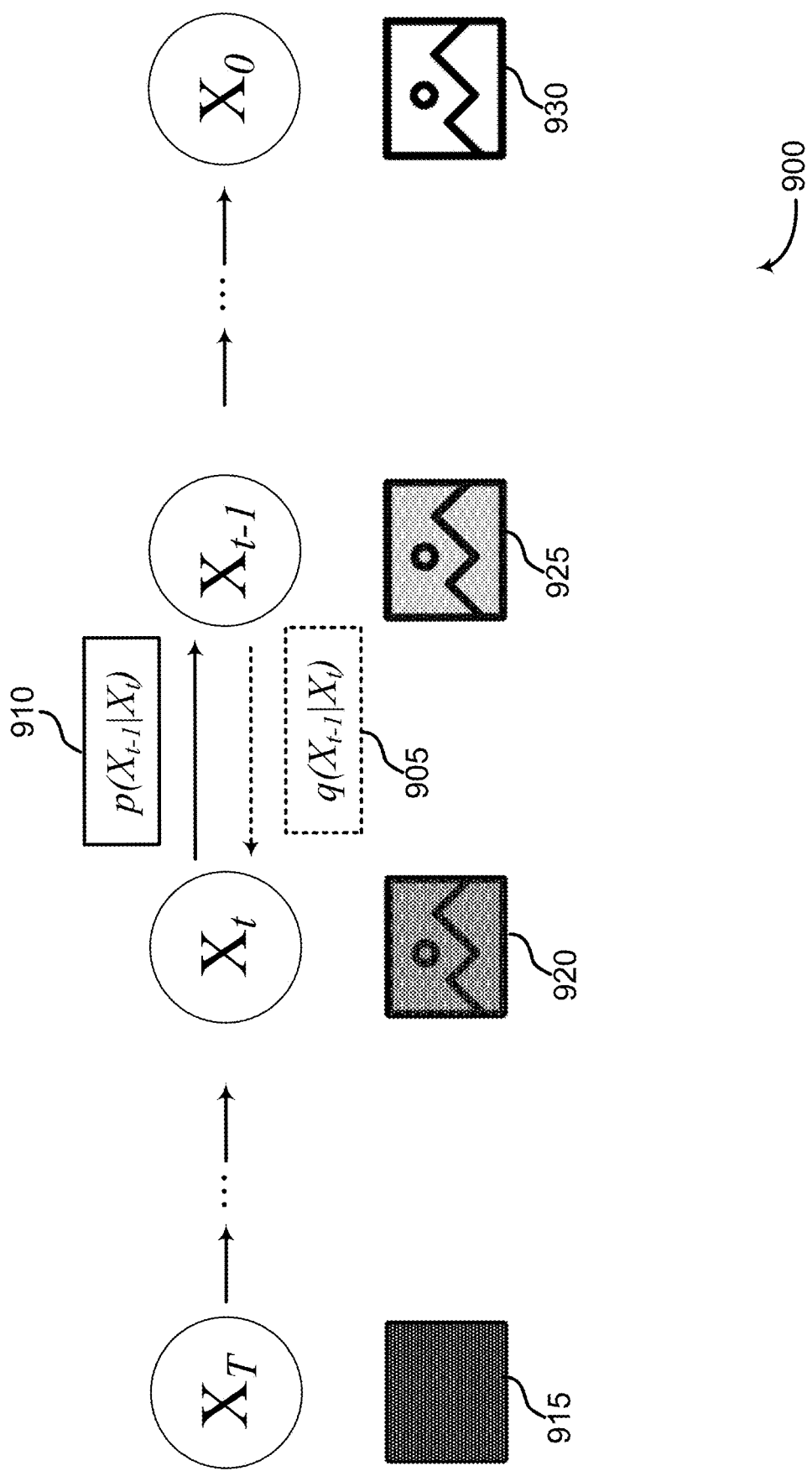
FIG. 9 shows a diffusion process according to aspects of the present disclosure.

FIG. 9 shows a diffusion process according to aspects of the present disclosure. In the example of FIG. 9, a forward diffusion model is shown where 915 is transformed to 930, as described in more detail herein. For example, 915 may be encoded into 920, 920 into 925, and 925 to 930. As described the 930 is used to { }, which may improve user experience.

As described with reference to FIG. 7, a diffusion model can include both a forward diffusion process 905 for adding noise to an image (or features in a latent space) and a reverse diffusion process 910 for denoising the images (or features) to obtain a denoised image. The forward diffusion process 905 can be represented as $q(x_t|x_{t-1})$, and the reverse diffusion process 910 can be represented as $p(x_{t-1}|x_t)$. In some cases, the forward diffusion process 905 is used during training to generate images with successively greater noise, and a neural network is trained to perform the reverse diffusion process 910 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$, have the same dimensionality as $x_0$.

The neural network may be trained to perform the reverse process. During the reverse diffusion process 910, the model begins with noisy data $x_T$, such as a noisy image 915 and denoises the data to obtain the $p(x_{t-1}|x_t)$. At each step t−1, the reverse diffusion process 910 takes $x_t$, such as first intermediate image 920, and t as input. Here, t represents a step in the sequence of transitions associated with different noise levels, The reverse diffusion process 910 outputs $x_{t-1}$, such as second intermediate image 925 iteratively until $x_T$ is reverted back to $x_0$, the original image 930. The reverse process can be represented as:

$$p_\theta(x_{t-1}|x_t):=N(x_{t-1};\mu_\theta(x_t,t),\Sigma_\theta(x_t,t)). \quad (1)$$

The joint probability of a sequence of samples in the Markov chain can be written as a product of conditionals and the marginal probability:

$$x_T \cdot p_\theta(x_{0:T}):=p(x_T)\Pi_{t=1}^T p_\theta(x_{t-1}|x_3), \quad (2)$$

where $p(x_T)=N(x_T; 0, I)$ is the pure noise distribution as the reverse process takes the outcome of the forward process, a sample of pure noise, as input and $\Pi_{t=1}^T p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Figure 10:
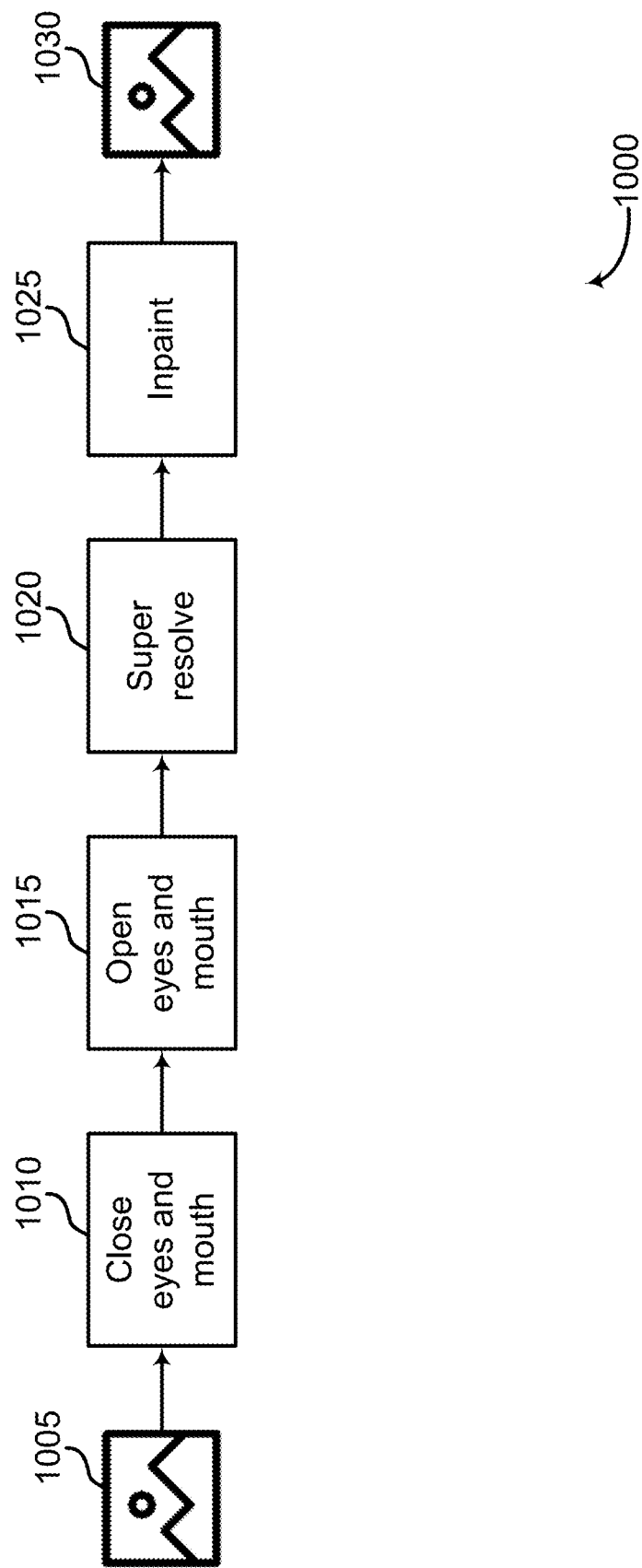
FIG. 10 shows an example of a process for generating a corrected image based on an original image according to aspects of the present disclosure.

FIG. 10 shows an example of a process 1000 for generating a corrected image based on an original image according to aspects of the present disclosure. In some examples, the described operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The process 1000 may accept an original image 1005 as input and may generate a corrected image 1030 as output. The process may include one or more operations performed on the original image 1005 to generate the corrected image

1030. The operations may include closing and opening the eyes and mouth in the original image 1005, super-resolution, and inpainting. Each operation may generate a corrected image, but the output of the process 1000 may correspond to the corrected image 1030 generated after performing the one or more of the operations in the process 1000. Each of the operations may be performed by an image processing apparatus described with reference to FIGS. 1 and 2.

Given a text input t, a diffusion model (e.g., Dalle or Imagen) may generate an image. The diffusion model may be a part of the image processing apparatus. The image processing apparatus may then apply face detection, detect one or more faces in the image, and crop out each face in the image. The image processing apparatus may perform the operations in process 1000 on each of the cropped-out faces (e.g., each of the crops) and the output of the process 1000 may be warped back (e.g., inserted) into the image generated by the diffusion model. The original image 1005 (I) may include one of the faces in the image generated by the diffusion model.

At operation 1010, the image processing apparatus may close the eyes and mouth in the original image 1005. In some examples, closing the eyes and mouth may be performed in the same operation or in different operations.

At operation 1015, the image processing apparatus may open the eyes and mouth in the original image 1005. In some examples, opening the eyes and mouth may be performed in the same operation or in different operations.

To enable a model to close and open the eyes in the original image 1005, a training component of the image processing apparatus may train a guided co-mod GAN that is guided by one value that represents the amount of eye openness (e.g., where a value of −1 corresponds to closed eyes and a value of 1 corresponds to open eyes). The image processing apparatus may use a StyleGAN and latent space manipulation to collect paired data for training. Then, the paired data may be used to train the guided co-mod GAN.

During inference, the image processing apparatus may pass the original image 1005 (I) and a value of −0.6 as input to the co-mod GAN to close the eyes in the original image 1005 and produce an intermediate image with closed eyes (e.g., the output of the operation 1010). The image processing apparatus may then pass the intermediate image and a value of +0.6 as input to the co-mod GAN to open the eyes in the original image 1005 and produce a corrected image with open eyes (e.g., the output of the operation 1015). The corrected image generated by the co-mod GAN (f) may correspond to I'=f(f(I, −0.6), 0.6). The corrected image may have a same amount of eye openness as the original image 1005, but the artifacts in the eyes of the original image 1005 may be removed by passing the original image 1005 through a model that is trained on natural faces. For example, because the model (e.g., the co-mod GAN) may have not seen artifacts around the eyes of different images (e.g., during training), the model may generate realistic eyes while maintaining the other parts of the original image 1005.

The operations performed to remove artifacts around the eyes may be similar to the operations performed to remove artifacts around the mouth (e.g., in the mouth region). For instance, to fix issues with the mouth of an image, a training component of the image processing apparatus may train a model (e.g., a guided co-mod GAN) that can change the amount of mouth openness. The model may be trained on paired data collected by synthetic data generation using a StyleGAN. In some examples, many issues with the mouth region of a face in an image (e.g., many irregularities with the mouth of a face in an image) may be corrected using the trained model (e.g., using similar techniques described for closing and opening the eyes).

At operation 1020, the image processing apparatus may super resolve the original image 1005 or the image output by operation 1015 to generate a corrected image (e.g., or a subsequent corrected image). In particular, super resolution is used to further improve the quality of the face generated by the image processing apparatus (e.g., to remove artifacts from the original image 1005). A model used to perform the super resolution may be trained on many real images. The image processing apparatus may down-sample each of the images into specific lower resolution bins (e.g., 32, 64, 128, 256, 512, and 1024) to generate paired data (e.g., pairs of images and their lower resolution counterparts). A training component of the image processing apparatus may then train a model (e.g., a co-mod GAN) using the paired data.

At operation 1025, the image processing apparatus may inpaint the original image 1005 or the image output by the operation 1020 to generate a corrected image (e.g., or a subsequent corrected image). Inpainting may allow a user to select regions of a face to inpaint or from which to remove artifacts. To train a model for inpainting, it may be appropriate to mimic similar masks as those that may be generated by a user (e.g., when using the image processing apparatus). To achieve this, a training component of the image processing apparatus may use an automatic mechanism to generate such masks. For example, for each training image, the training component may generate a 1024×1024 binary mask. The mask may be composed of a random number of elliptical holes at random positions and with random orientations, widths, and heights. The training component may then apply a segmentation model on the training image to identify the face in the training image (e.g., detect the face), and the training component may perform a logical and of the original mask with the face region. The resulting mask may have random holes, but only in the face region of the training image. The model may then learn to inpaint holes in the face region of arbitrary sizes and positions.

After performing one or more of the operations 1010, 1015, 1020, and 1025, the image processing apparatus may generate the corrected image 1030 using the process 1000. The image processing apparatus may then provide the corrected image 1030 to a user.

Figure 11:
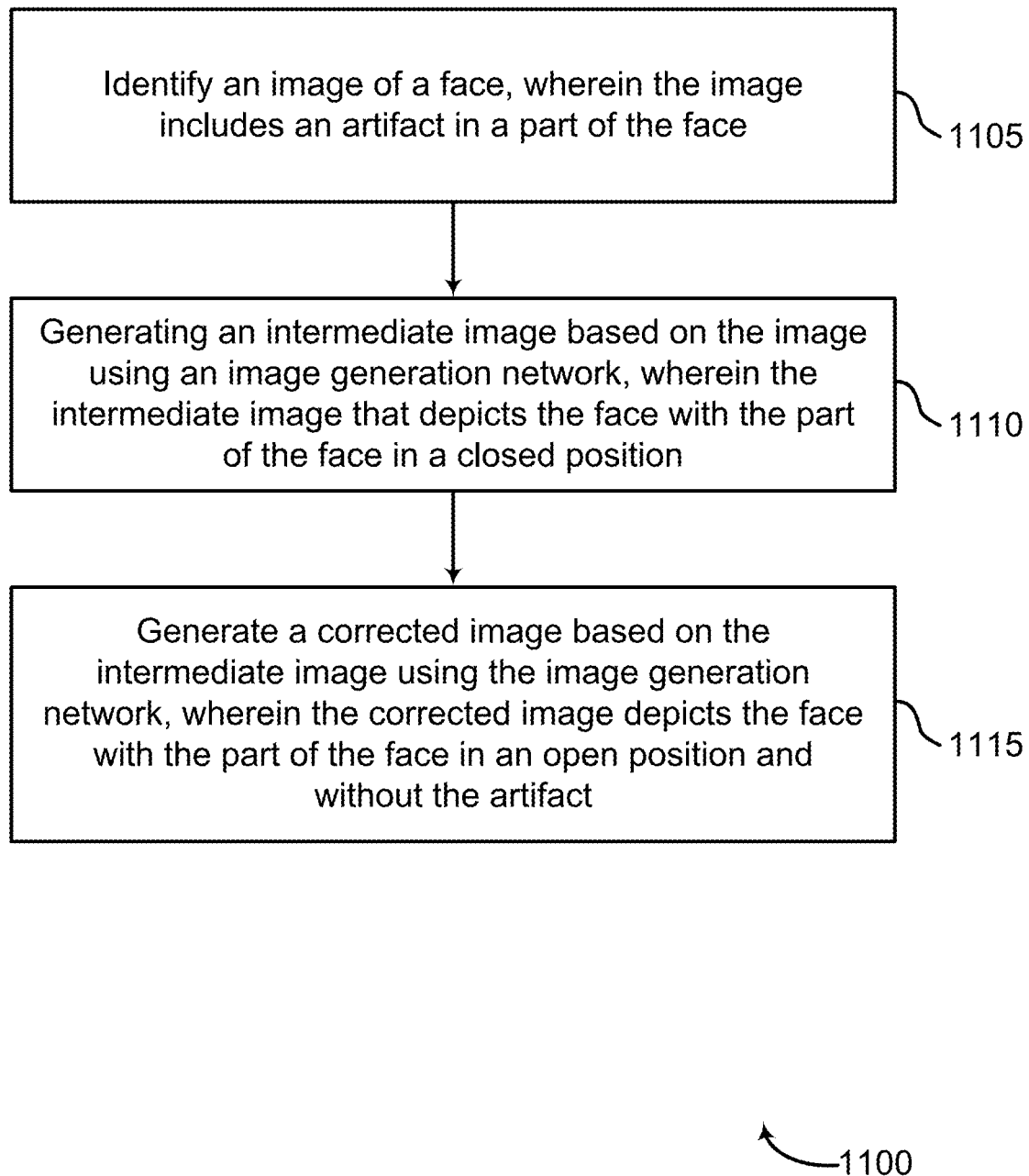
FIGS. 11 through 12 show examples of methods for machine learning according to aspects of the present disclosure.

FIG. 11 shows an example of a method 1100 for machine learning according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system identifies an image of a face, where the image includes an artifact in a part of the face. In some cases, the operations of this step refer to, or may be performed by, an image generation network as described with reference to FIG. 2.

At operation 1110, the system generates an intermediate image based on the image using an image generation network, where the intermediate image depicts the face with the part of the face in a closed position. In some cases, the operations of this step refer to, or may be performed by, an image generation network as described with reference to FIG. 2.

The term "closed position" can refer to any position in which the part of the face (i.e., the eyes or mouth) are more closed than in the original image. In some cases the eyes or mouth are closed completely, but in other cases, the eyes or mouth are only partially closed. A parameter can be set that determines the extent to which the eyes are mouth are closed. Leaving the eyes partially open can ensure that characteristics such as eye color remain when the image is corrected. in some cases a user may select a parameter that determines the extent to which the eyes or mouth are closed or left partially open.

At operation 1115, the system generates a corrected image based on the intermediate image using the image generation network, where the corrected image depicts the face with the part of the face in an open position and without the artifact. In some cases, the operations of this step refer to, or may be performed by, an image generation network as described with reference to FIG. 2.

Figure 12:
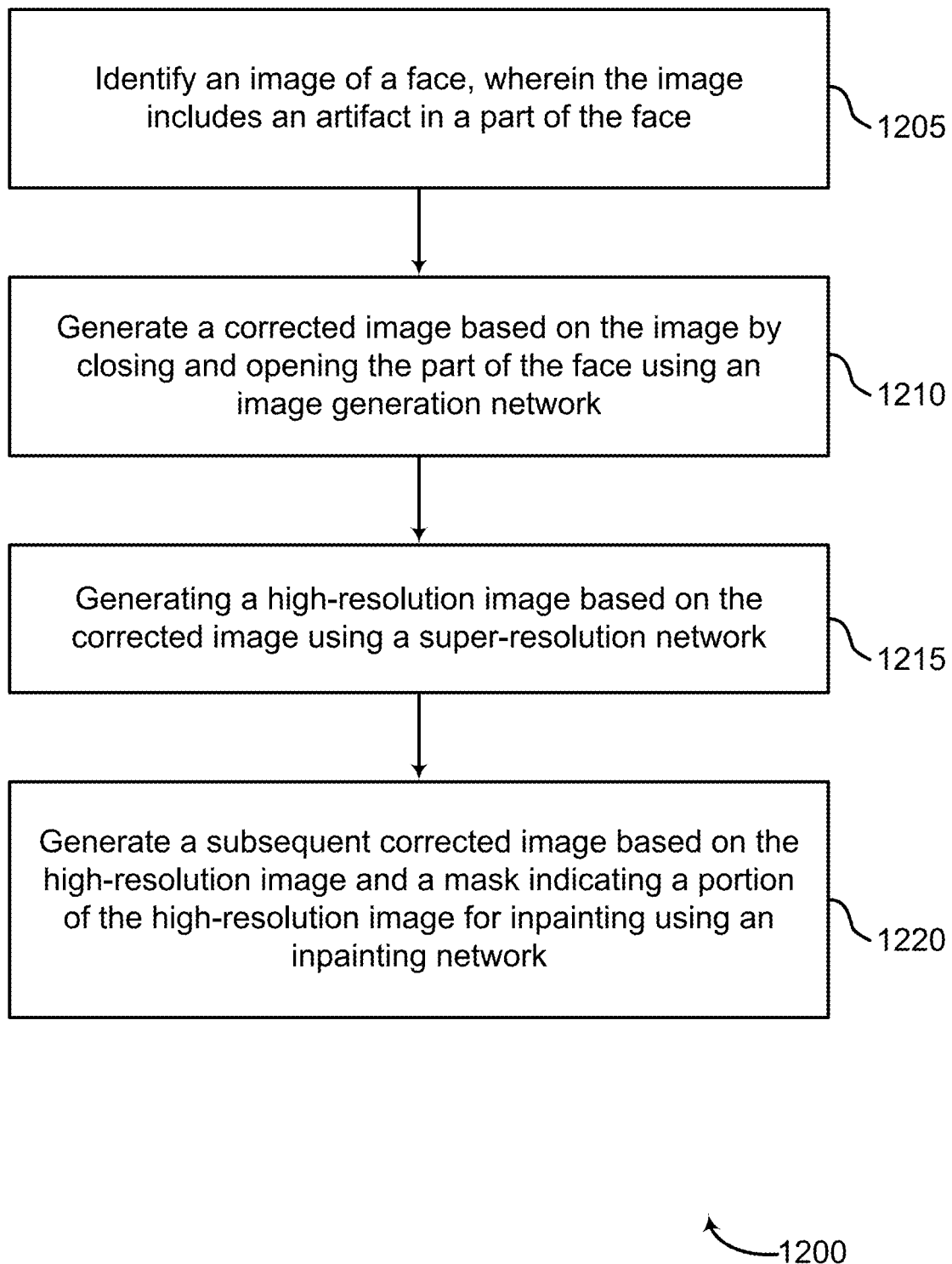

FIG. 12 shows an example of a method 1200 for machine learning according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system identifies an image of a face, where the image includes an artifact in a part of the face. In some cases, the operations of this step refer to, or may be performed by, an image generation network as described with reference to FIG. 2.

At operation 1210, the system generates a corrected image based on the image by closing and opening the part of the face using an image generation network. In some cases, the operations of this step refer to, or may be performed by, an image generation network as described with reference to FIG. 2.

At operation 1215, the system generates a high-resolution image based on the corrected image using a super-resolution network. In some cases, the operations of this step refer to, or may be performed by, a super-resolution network as described with reference to FIG. 2.

At operation 1220, the system generates a subsequent corrected image based on the high-resolution image and a mask indicating a portion of the high-resolution image for inpainting using an inpainting network. In some cases, the operations of this step refer to, or may be performed by, an inpainting network as described with reference to FIG. 2.

Training

Figure 13:
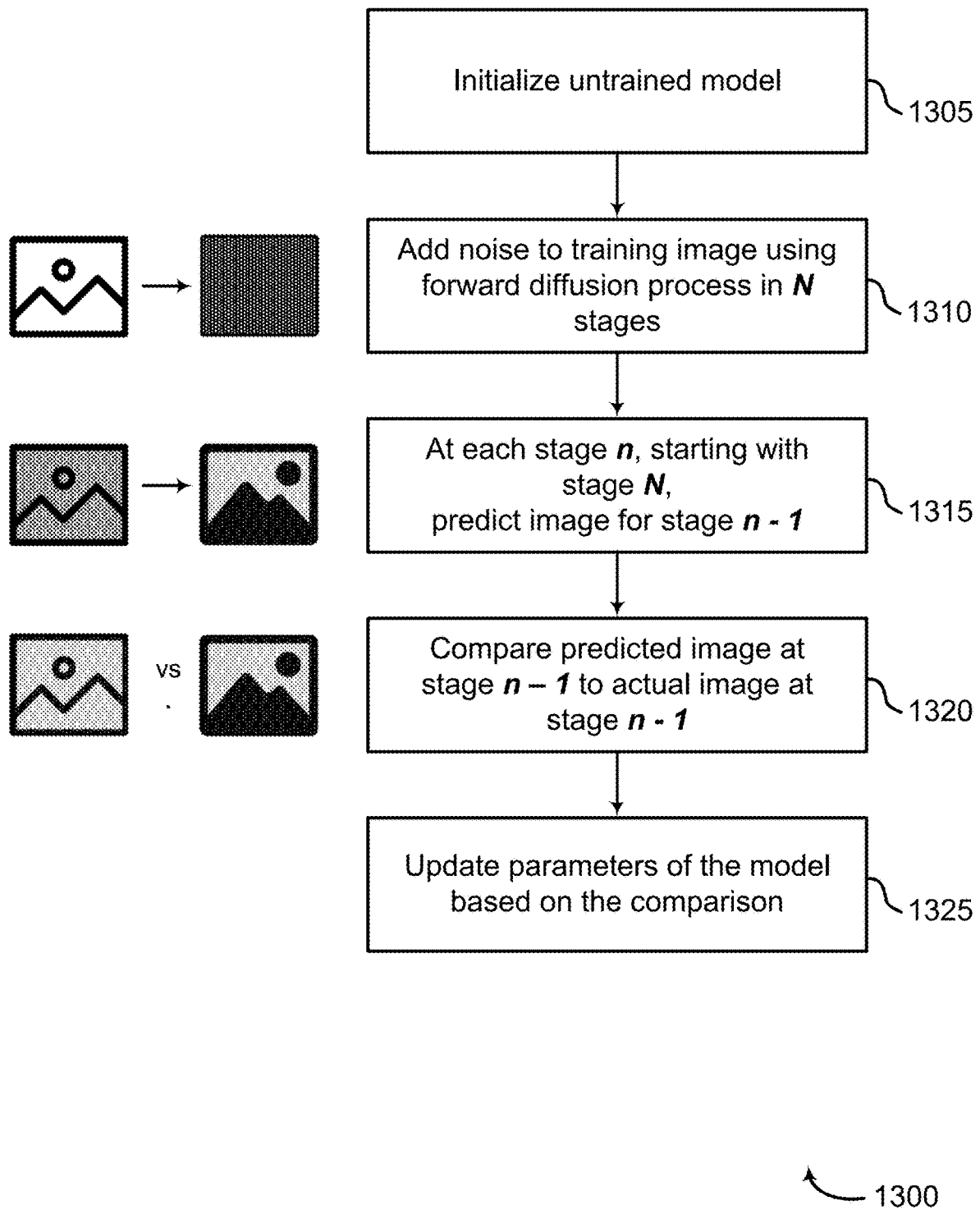
FIG. 13 shows an example of a method for training a diffusion model according to aspects of the present disclosure.

FIG. 13 shows an example of a method 1300 for training a diffusion model according to aspects of the present disclosure. The method 1300 represents an example for training a reverse diffusion process as described above with reference to FIG. 9. In some examples, these operations are performed by a system including a processor executing a set of codes to control functional elements of an apparatus, such as the apparatus described in FIG. 2.

Additionally, or alternatively, certain processes of method 1300 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1310, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1315, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1320, the system compares predicted image (or image features) at stage n−1 to an actual image (or image features), such as the image at stage n−1 or the original input image. For example, given observed data x, the diffusion model may be trained to minimize the variational upper bound of the negative log-likelihood−log $p_\theta(x)$ of the training data.

At operation 1325, the system updates parameters of the model based on the comparison. For example, parameters of a U-Net may be updated using gradient descent. Time-dependent parameters of the Gaussian transitions can also be learned.

Figure 14:
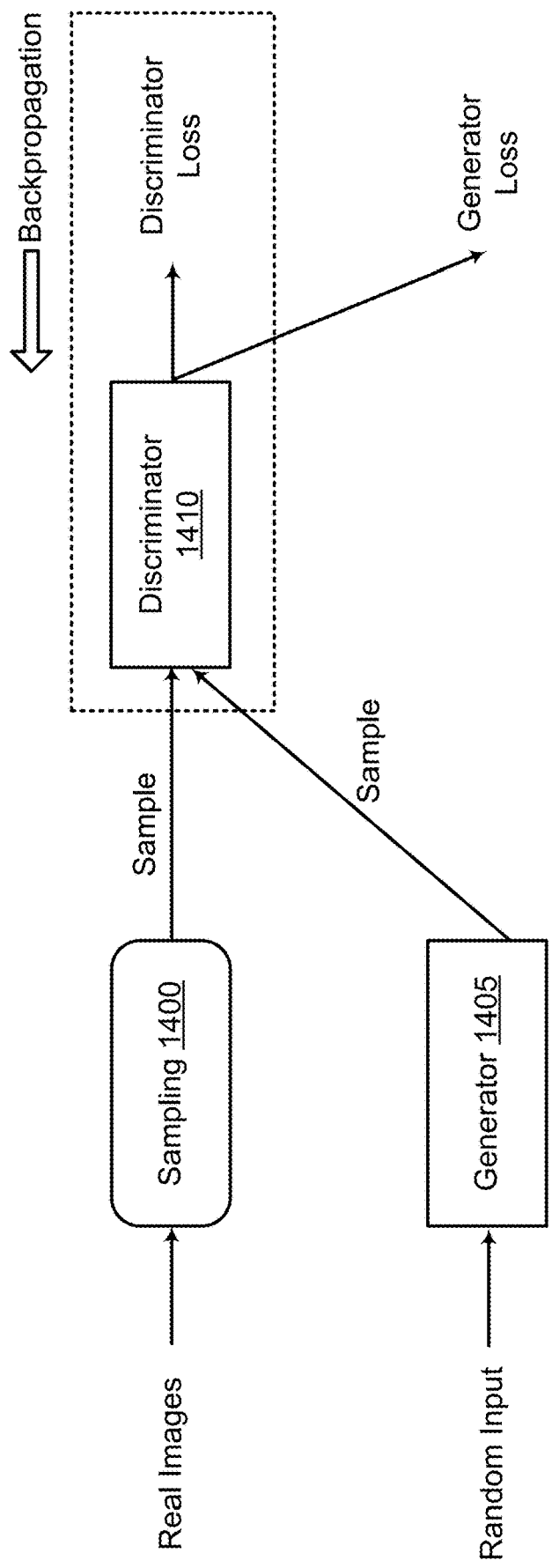
FIG. 14 shows an example of generative adversarial network (GAN) training according to aspects of the present disclosure.

FIG. 14 shows an example of GAN training according to aspects of the present disclosure. The example shown includes generator 1405 and discriminator 1410. A GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network, i.e., to produce novel candidates that the discriminator network classifies as real. In training, the generator network generates false data, and the discriminator network learns the false data.

Referring to FIG. 14, at operation 1400 (e.g., sampling 1400), sample (e.g., real data) is generated from real images. The sample generated from the real images is the first input to discriminator 1410. Discriminator 1410 uses the real data as positive examples during training. In some embodiments, the operations of this step refer to, or may be performed by, a training component as described with reference to FIG. 2.

According to an embodiment, generator 1405 receives random input and generates a sample (e.g., false data). The sample generated by generator 1405 is the second input to the discriminator 1410. Discriminator 1410 uses the false data as negative examples during training.

In discriminator training, generator 1405 is not trained. The weights of the generator 1405 remain constant while generator 1405 generates examples for discriminator 1410. In some embodiments, discriminator 1410 is trained based on a generator loss. First, discriminator 1410 classifies the real data and the false data generated by generator 1405. Then, the discriminator loss is used to penalize discriminator 1410 for misclassifying a real data as false or a false data as real. Next, discriminator 1410 updates the weights of discriminator 1410 through backpropagation from the discriminator loss through discriminator 1410.

GAN training proceeds in alternating periods. For example, discriminator 1410 is trained for one or more epochs and generator 1405 is trained for one or more epochs. The training component continues to train generator 1405 and discriminator 1410 in such a way.

Figure 15:
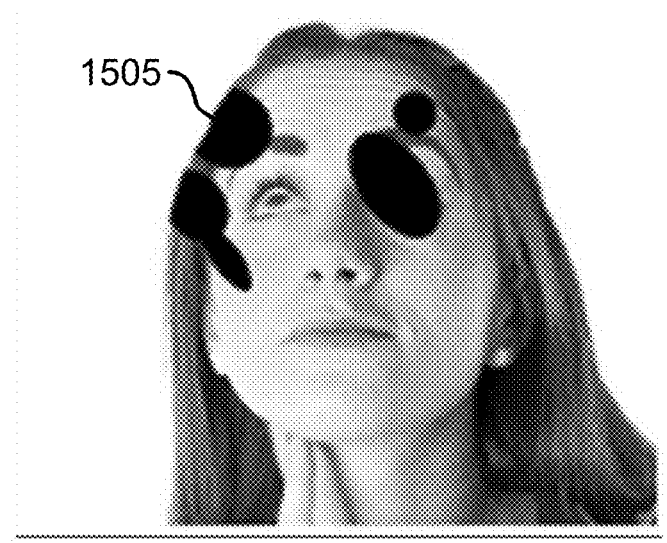
FIG. 15 shows an example of a training image with a mask for inpainting according to aspects of the present disclosure.

FIG. 15 shows an example of a training image 1500 with a mask for inpainting according to aspects of the present disclosure. A training component of an image processing apparatus may generate the mask for inpainting the training image to mimic a mask that may be generated by a user for inpainting a generated image. Thus, the training data for training a model for inpainting may include images and randomly generated masks for inpainting the images. The mask may be composed of a random number of elliptical holes 1505 at random positions and with random orientations, widths, and heights. The model may then learn to inpaint the holes 1505 in the training image 1500.

Figure 16:
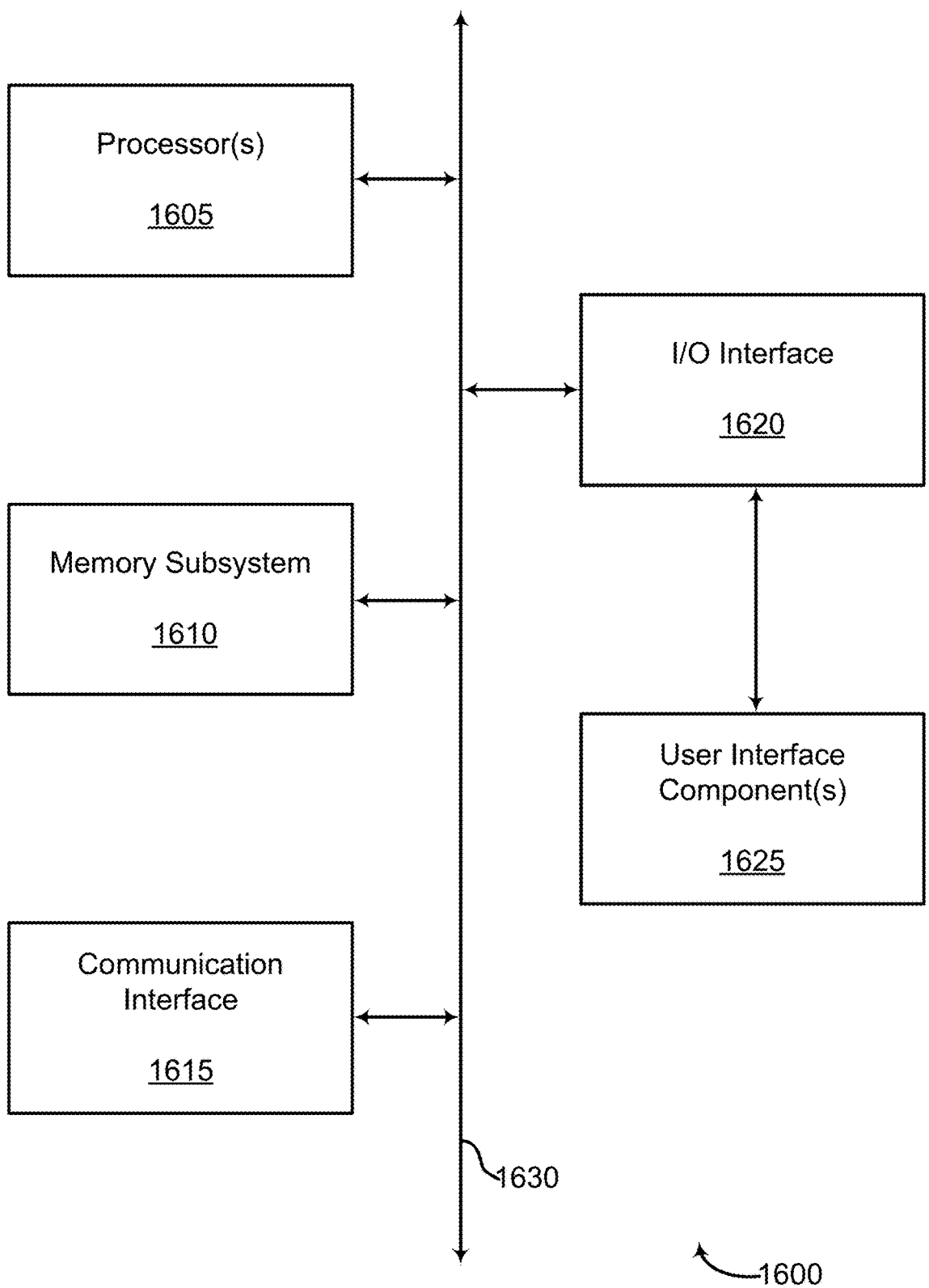
FIG. 16 shows an example of a computing device for image generation and image editing according to aspects of the present disclosure.

FIG. 16 shows an example of a computing device for image generation and image editing according to aspects of the present disclosure. In one aspect, computing device 1600 includes processor(s) 1605, memory subsystem 1610, communication interface 1615, I/O interface 1620, user interface component(s) 1625, and channel 1630.

In some embodiments, computing device 1600 is an example of, or includes aspects of, image processing apparatus 200 of FIG. 2. In some embodiments, computing device 1600 includes one or more processors 1605 that can execute instructions stored in memory subsystem 1610 for identifying a region of an image containing text; identifying a color of the text; and generating a modified image using a diffusion model based on the color of the text, wherein the modified image has a background color in the region of the image that contrasts with the color of the text.

According to some aspects, computing device 1600 includes one or more processors 1605. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1610 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1615 operates at a boundary between communicating entities (such as computing device 1600, one or more user devices, a cloud, and one or more databases) and channel 1630 and can record and process communications. In some cases, communication interface 1615 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1620 is controlled by an I/O controller to manage input and output signals for computing device 1600. In some cases, I/O interface 1620 manages peripherals not integrated into computing device 1600. In some cases, I/O interface 1620 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1620 or via hardware components controlled by the I/O controller.

According to some aspects, user interface component(s) 1625 enable a user to interact with computing device 1600. In some cases, user interface component(s) 1625 include an audio device, such as an external speaker system, an external display device such as a display screen, an input device (e.g., a remote-control device interfaced with a user interface directly or through the I/O controller), or a combination thereof. In some cases, user interface component(s) 1625 include a GUI.

Accordingly, the present disclosure includes the following aspects.

A method for machine learning for image processing is described. One or more aspects of the method include identifying an image of a face, wherein the image includes an artifact in a part of the face; generating an intermediate image based on the image using an image generation network, wherein the intermediate image depicts the face with the part of the face in a closed position; and generating a corrected image based on the intermediate image using the image generation network, wherein the corrected image depicts the face with the part of the face in an open position and without the artifact.

Some examples of the method, apparatus, non-transitory computer readable medium, and system further include generating image using a diffusion model, wherein the artifact is a product of the diffusion model.

Some examples of the method, apparatus, non-transitory computer readable medium, and system further include identifying an attribute associated with the position of the part of the face. Some examples further include selecting a first value for the attribute associated with the closed position. Some examples further include providing the first value for the attribute to the image generation network, wherein the intermediate image is based on the first value.

Some examples of the method, apparatus, non-transitory computer readable medium, and system further include selecting a second value for the attribute associated with the open position. Some examples further include providing the second value for the attribute to the image generation network, wherein the corrected image is based on the second value.

In some aspects, the part of the face comprises an eye or a mouth.

Some examples of the method, apparatus, non-transitory computer readable medium, and system further include identifying training data including first training images showing faces including artifacts in the part of the face and second training images corresponding to the first training images without the artifacts in the part of the face. Some examples further include training the image generation network based on the training data.

Some examples of the method, apparatus, non-transitory computer readable medium, and system further include generating a high-resolution image based on the corrected image using a super-resolution network.

Some examples of the method, apparatus, non-transitory computer readable medium, and system further include identifying a plurality of high-resolution images. Some examples further include generating a plurality of low-resolution images based on the high-resolution images. Some examples further include training the super-resolution network based on the plurality of high-resolution images and the plurality of low-resolution images.

Some examples of the method, apparatus, non-transitory computer readable medium, and system further include identifying a portion of the image including an additional artifact. Some examples further include generating a subsequent corrected image based on the corrected image and the identified portion using an inpainting network.

Some examples of the method, apparatus, non-transitory computer readable medium, and system further include identifying a plurality of images. Some examples further include generating a plurality of image masks for the plurality of images, respectively, by applying a random number of inpainting regions with randomized positions. Some examples further include training the inpainting network based on the plurality of images and the plurality of image masks.

Some examples of the method, apparatus, non-transitory computer readable medium, and system further include displaying the corrected image to a user. Some examples further include receiving a user input indicating the portion of the image. Some examples further include generating a binary mask indicating the portion of the image, wherein the subsequent corrected image is generated based on the binary mask.

A method for machine learning for image processing is described. One or more aspects of the method include identifying an image of a face, wherein the image includes an artifact in a part of the face; generating a corrected image based on the image by closing and opening the part of the face using an image generation network; generating a high-resolution image based on the corrected image using a super-resolution network; and generating a subsequent corrected image based on the high-resolution image and a mask indicating a portion of the high-resolution image for inpainting using an inpainting network.

Some examples of the method, apparatus, non-transitory computer readable medium, and system further include identifying an attribute associated with the position of the part of the face. Some examples further include selecting a first value for the attribute associated with the closed position. Some examples further include providing the first value for the attribute to the image generation network. Some examples further include generating the corrected image based on the first value using the image generation network.

Some examples of the method, apparatus, non-transitory computer readable medium, and system further include selecting a second value for the attribute associated with the open position. Some examples further include providing the second value for the attribute to the image generation network, wherein the corrected image is generated based on the second value.

An apparatus for machine learning for image processing is described. One or more aspects of the apparatus include a processor; a memory including instructions executable by the processor; a diffusion model configured to generate an image that includes an artifact in a part of a face; and an image generation network configured to generating a corrected image based on the by closing and opening the part of the face.

In some aspects, the image generation network comprises a co-modulated GAN.

In some aspects, the super-resolution network comprises a GAN.

Some examples of the apparatus, system, and method further include a super-resolution network configured to generate a high-resolution image based on the corrected image.

Some examples of the apparatus, system, and method further include an inpainting network configured to generate a subsequent corrected image based on the high-resolution image and a mask indicating portion of the high-resolution image for inpainting.

In some aspects, the inpainting network comprises a GAN with an encoding module configured to encode image context.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   identifying an image of a face with an expression comprising an open position of a part of the face, wherein the image includes an artifact in the part of the face;
   selecting a first value for an input attribute, wherein the first value indicates a modified expression comprising a closed position of the part of the face;
   generating an intermediate image based on the image and the first value for the input attribute using an image generation network trained to modify a position of the part of the face based on the input attribute, wherein the intermediate image depicts the face with the modified expression comprising the part in the closed position;
   selecting a second value for the input attribute, wherein the second value indicates the expression comprising the open position of the part of the face; and
   generating a corrected image based on the intermediate image and the second value for the input attribute using the image generation network, wherein the corrected image depicts the face with the expression comprising the part of the face in the open position and without the artifact.

2. The method of claim 1, wherein:
   the image is generated using a diffusion model and the artifact is a product of the diffusion model.

3. The method of claim 1, further comprising:
   providing the first value for the input attribute to the image generation network.

4. The method of claim 3, further comprising:
   providing the second value for the input attribute to the image generation network.

5. The method of claim 1, wherein:
   the part of the image comprises an eye or a mouth.

6. The method of claim 1, further comprising:
   generating a high-resolution image based on the corrected image using a super-resolution network.

7. The method of claim 1, further comprising:
   identifying a portion of the image including an additional artifact; and
   generating a subsequent corrected image based on the corrected image and the identified portion using an inpainting network.

8. The method of claim 1, further comprising:
   displaying the corrected image to a user;
   receiving a user input indicating a portion of the image; and
   generating a binary mask indicating the portion of the image, wherein a subsequent corrected image is generated based on the binary mask.

9. The method of claim 1, further comprising:
   identifying training data including first training images showing faces including artifacts in the part of the face and second training images corresponding to the first training images without the artifacts in the part of the face, wherein the image generation network is trained based on the training data.

10. A non-transitory computer-readable medium storing executable instructions, which when executed by a processing device, cause the processing device to perform operations comprising:
    identifying an image of a face with an expression comprising an open position of a part of the face, wherein the image includes an artifact in the part of the face;
    selecting a first value for an input attribute, wherein the first value indicates a modified expression comprising a closed position of the part of the face;
    generating an intermediate image based on the image and the first value for the input attribute using an image generation network trained to modify a position of the part of the face based on the input attribute, wherein the intermediate image depicts the face with the modified expression comprising the part in the closed position;
    selecting a second value for the input attribute, wherein the second value indicates the expression comprising the open position of the part of the face;
    generating a corrected image based on the intermediate image and the second value for the input attribute using the image generation network, wherein the corrected image depicts the face with the expression comprising the part of the face in the open position and does not include the artifact in the part of the face;
    generating a high-resolution image based on the corrected image using a super-resolution network; and
    generating a subsequent corrected image based on the high-resolution image and a mask indicating portion of the high-resolution image for inpainting using an inpainting network.

11. The non-transitory computer-readable medium of claim 10, wherein the instructions are further executable to perform operations comprising:
    providing the first value for the input attribute to the image generation network.

12. The non-transitory computer-readable medium of claim 11, wherein the instructions are further executable to perform operations comprising:
    providing the second value for the input attribute to the image generation network.

13. A system comprising:
a memory component; and
a processing device coupled to the memory component, the processing device configured to perform operations comprising:
  identifying an image of a face with an expression comprising an open position of a part of the face, wherein the image includes an artifact in the part of the face;
  selecting a first value for an input attribute, wherein the first value indicates a modified expression comprising a closed position of the part of the face;
  generating an intermediate image based on the image and the first value for the input attribute using an image generation network trained to modify a position of the part of the face based on the input attribute, wherein the intermediate image depicts the face with the modified expression comprising the part in the closed position;
  selecting a second value for the input attribute, wherein the second value indicates the expression comprising the open position of the part of the face; and
  generating a corrected image based on the intermediate image and the second value for the input attribute using the image generation network, wherein the corrected image depicts the face with the expression comprising the part of the face in the open position and without the artifact.

14. The system of claim 13, wherein:
the image is generated using a diffusion model and the artifact is a product of the diffusion model.

15. The system of claim 13, the processing device further configured to perform operations comprising:
  providing the first value for the input attribute to the image generation network.

16. The system of claim 15, the processing device further configured to perform operations comprising:
  providing the second value for the input attribute to the image generation network.

17. The system of claim 13, wherein:
the part of the image comprises an eye or a mouth.

18. The system of claim 13, the processing device further configured to perform operations comprising:
  generating a high-resolution image based on the corrected image using a super-resolution network.

19. The system of claim 13, the processing device further configured to perform operations comprising:
  identifying a portion of the image including an additional artifact; and
  generating a subsequent corrected image based on the corrected image and the identified portion using an inpainting network.

20. The system of claim 13, the processing device further configured to perform operations comprising:
  displaying the corrected image to a user;
  receiving a user input indicating a portion of the image; and
  generating a binary mask indicating the portion of the image, wherein a subsequent corrected image is generated based on the binary mask.

* * * * *